(12) United States Patent
Ohtani

(10) Patent No.: US 8,131,159 B2
(45) Date of Patent: Mar. 6, 2012

(54) TRANSMISSION APPARATUS AND OPTICAL TRANSMISSION APPARATUS

(75) Inventor: Toshihiro Ohtani, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 426 days.

(21) Appl. No.: 12/457,051

(22) Filed: May 29, 2009

(65) Prior Publication Data

US 2010/0040381 A1 Feb. 18, 2010

(30) Foreign Application Priority Data

Aug. 13, 2008 (JP) ................................. 2008-208346

(51) Int. Cl.
*H04B 10/04* (2006.01)
(52) U.S. Cl. ......... 398/197; 398/195; 398/192; 398/182
(58) Field of Classification Search .................. 398/197, 398/195, 192, 182
See application file for complete search history.

(56) References Cited

U.S. PATENT DOCUMENTS 6,327,076 B1 * 12/2001 Akiyama ................. 359/337.11
6,487,008 B2 * 11/2002 Morito .......................... 359/344

FOREIGN PATENT DOCUMENTS

| AF | 2000-307552 | 11/2000 |
| JP | 2002-208758 | 7/2002 |

* cited by examiner

*Primary Examiner* — Kinam Park
(74) *Attorney, Agent, or Firm* — Staas & Halsey LLP

(57) ABSTRACT

In a transmission apparatus, a monitor unit monitors a signal level and generates a monitored value; a level control unit controls the level of the input signal in accordance with the monitored value; an output amplification unit amplifies and outputs the level-controlled signal; and a control unit controls unit operation statuses in accordance with setting information. The control unit recognizes the period of duration of a single level in the input signal, from the signal format given by the setting information, and performs variable control of at least one of a monitor time constant, a response time from the signal input to the monitor unit until the generation of the monitored value, and a level setting time constant, a response time from the input of the monitored value to the level control unit until the execution of level control, in accordance with the period of duration of the single level.

3 Claims, 18 Drawing Sheets

| SIGNAL TYPE | FORMAT | TRANSMISSION RATE (Mbps) | NUMBER OF CONSECUTIVE '1' BITS | PERIOD OF DURATION OF LEVEL '1' (ns) | NUMBER OF CONSECUTIVE '0' BITS | PERIOD OF DURATION OF LEVEL '0' (ns) |
|---|---|---|---|---|---|---|
| SONET | OC-192 | 9953.28 | ≦72 BITS | 7.23 | ≦72 BITS | 7.23 |
| | OC-48 | 2488.32 | ≦72 BITS | 28.94 | ≦72 BITS | 28.94 |
| | OC-12 | 622.08 | ≦72 BITS | 115.74 | ≦72 BITS | 115.74 |
| | OC-3 | 155.52 | ≦72 BITS | 462.96 | ≦72 BITS | 462.96 |

| SIGNAL TYPE | FORMAT | TRANSMISSION RATE (Mbps) | NUMBER OF CONSECUTIVE '0' BITS (PACKET GAP LENGTH) | PERIOD OF DURATION OF LEVEL '0' (PACKET GAP PERIOD: ns) |
|---|---|---|---|---|
| Ethernet | 10GbE | 10312.5 | ≧96 BITS | 9.31 |
| | GbE | 1250 | ≧96 BITS | 76.80 |
| | Fast Ethernet | 125 | ≧96 BITS | 768.00 |

FIG. 7

| ITEM | WHEN THERE ARE CONSECUTIVE '0' BITS (MORE '0' BITS) | WHEN THERE ARE CONSECUTIVE '1' BITS (MORE '1' BITS) |
|---|---|---|
| VOA CONTROL | DECREASES LOSS LEVEL (DECREASES ATTENUATION) | INCREASES LOSS LEVEL (INCREASES ATTENUATION) |
| SOA INPUT LEVEL | IF '1' IS INPUT WHILE VOA IS BYPASSED, INPUT LEVEL IS EXCESSIVELY HIGH FOR SOA | IF NORMAL DATA (WITH MARK RATIO OF ABOUT 1/2) IS INPUT WHILE VOA IS OPERATED, INPUT LEVEL APPEARS TO BE LOWER THAN ORIGINALLY EXPECTED INPUT LEVEL |
| SOA OUTPUT LEVEL | OPTICAL INPUT OF EXCESSIVELY HIGH LEVEL WHILE VOA IS BYPASSED SATURATES OUTPUT, DISTORTING OUTPUT WAVEFORM | INPUT LEVEL IS TOO LOW TO OBTAIN DESIRED OUTPUT LEVEL |

FIG. 18
RELATED ART

TRANSMISSION APPARATUS AND OPTICAL TRANSMISSION APPARATUS

CROSS-REFERENCE TO RELATED APPLICATIONS

This application is based upon and claims the benefit of priority of the prior Japanese Patent Application No. 2008-208346, filed on Aug. 13, 2008, the entire contents of which are incorporated herein by reference.

FIELD

The embodiments discussed herein are related to transmission apparatuses for transmitting a signal and optical transmission apparatuses for performing optical transmission.

BACKGROUND

In recent years, semiconductor optical amplifiers (SOAs) which vary their gain with drive current are attracting attention as optical amplifiers in optical communication systems.

The SOA is an optical amplifying element made of compound semiconductor such as indium phosphide. The output is not as large as the output of an erbium-doped fiber amplifier (EDFA), which uses erbium-doped fiber as an amplifying medium. With advantages such as small size and wide amplification band, the SOA can be used also as an optical gate element and has been becoming widely used in next-generation photonic systems.

The graph in FIG. 10 represents output levels of the SOA. The vertical axis represents the output level in dBm, and the horizontal axis represents the input level in dBm. The graph demonstrates the output levels varying with the input level, depending on the drive current injected into the SOA.

The output level of the SOA depends on the injected drive current, and if the optical input level is the same, the optical output level increases with increased drive current. There are two regions divided by a certain input level L0. In a region up to the input level L0, the output level increases linearly with increase in input level. In a region beyond the input level L0, the output level stops increasing. The former region is referred to as a non-saturation region, and the latter a saturation region.

The gradient of the line corresponds to gain. The constant gradient in the non-saturation region means that the gain is constant. The gradient in the saturation region becomes smaller than that in the non-saturation region, meaning that the gain decreases.

The graph in FIG. 11 represents the gain of the SOA. With the vertical axis representing the gain in dB and the horizontal axis representing the output level in dBm, the graph represents the gain characteristics of the SOA receiving continuous light. The graph clearly indicates that the amplifier gain drops sharply with increase in the output level in the saturation range.

The SOA has such amplification characteristics in the non-saturation region that the gain is constant while the injected drive current is constant and that increased input level increases the output level. In the saturation region, the gain decreases with increase in input level. This prevents the output level from exceeding a certain level.

For example, if the SOA with an optical input of −10 dBm delivers an amplified optical output of 0 dBm, the gain is 10 dB. With a constant drive current, the 10 dB gain is kept in the non-saturation region, to deliver an optical output of 5 dBm from an optical input of −5 dBm.

In the non-saturation region, the gain is kept constant irrespective of the input level, and the output level becomes proportional to the input level. In the saturation region, however, the gain is not maintained but decreases, and the output level will be saturated (the increased output level reaches a limit).

The diagram in FIG. 12 illustrates the structure of a conventional optical amplifier 50 using the SOA. The optical amplifier 50 includes a variable optical attenuator (VOA) 51, an SOA 52, a monitor unit 53, a VOA control unit 54, and a coupler C. The monitor unit 53 includes a photodiode (PD) 53a and an A-D converter 53b.

The VOA 51 performs attenuation control (loss level control) for the level of the optical signal input to the optical amplifier 50, in accordance with a control signal. The optical output from the VOA 51 is split into two parts by a coupler C, one part being input to the SOA 52 and the other part being input to the monitor unit 53. The SOA 52 amplifies the optical input in accordance with a drive current specified to provide a desired gain.

In the monitor unit 53, the PD 53a converts the optical input signal to an electric signal. The A-D converter 53b converts the electric signal to a digital signal and outputs it as a monitored value. The VOA control unit 54 adjusts the level of the optical input to the SOA 52 appropriately in accordance with the monitored value, so that the SOA 52 can deliver a desired level of amplified optical output without saturation.

A disclosed conventional optical amplification control technology keeps a constant amplification factor of the SOA through keeping a constant level of optical input power by means of an attenuator (refer to Japanese Laid-open Patent Publication No. 2002-208758 (paragraphs [0004] and [0005], and FIG. 1)). In another disclosed technology, false optical signals are provided on the short wavelength side and the long wavelength side of the wavelength band and multiplexed with the optical signal for optical amplification, and the wavelength characteristics within the wavelength band of the optical signal are controlled in accordance with the monitored results (Japanese Laid-open Patent Publication No. 2000-307552 (paragraphs [0036] and [0037], and FIG. 1)).

In the conventional optical amplifier 50 described above, if the input optical signal is held to a certain level for a long time (the period of level '0' or '1' lasts long), the SOA 52 could deliver an optical output with distorted waveform or could not provide a desired level of output.

FIG. 13 illustrates a single level maintained in different signal formats. In the synchronous optical network/synchronous digital hierarchy (SONET/SDH) signal format, up to 72 consecutive bits in a single frame can be held to '0' or '1'.

In the SONET/SDH format, the maximum number of consecutive bits that can be held to the same level within a single frame is predetermined, irrespective of the transmission rate. Since a lower transmission rate means a longer duration of a single pulse, the same level is maintained for a longer period.

In the Ethernet (registered trademark) signal format, the maximum number of consecutive bits that can be held to the same level within a single packet is not specified. However, a gap (corresponding to consecutive '0' bits) between packets is significant in the Ethernet. The minimum packet gap is specified as 12 bytes (96 bits).

A lower transmission rate means a longer duration of a '0' bit, expanding the packet gap between packets n and n+1 and increasing the duration of level '0'.

FIGS. 14 to 16 show monitored values depending on unbalanced bits. Being driven at a low rate in comparison with the transmission rate of the optical input signal, the monitor unit 53 cannot monitor the optical power in bits. The monitor unit 53 monitors the average power of varying bits and outputs it as a monitored value. If the bit values are unbalanced, the monitored value will increase or decrease (if there are many '0' bits or '1' bits, the average power will decrease or increase).

FIG. 14 presents the average power of an optical input signal when the mark ratio (probability of occurrence of '1' bits) is about 1/2. If the probabilities of occurrence of '1' bits and '0' bits are about the same, the average power (normal monitored value) is 3 dB lower than the peak level of the optical input signal.

FIG. 15 presents the average power of an optical input signal when the mark ratio is close to 1. If the probability of occurrence of '1' bits is high, the average power approaches the peak level. FIG. 16 presents the average power of an optical input signal when the mark ratio is close to 0. If the probability of occurrence of '0' bits is high, the average power approaches the bottom level.

Suppose that level '0' lasts long. If an optical signal having more '0' bits is input to the VOA 51, the VOA control unit 54 judges from the monitored value (indicating the average power) that the level of the optical input signal has been lowered (see FIG. 16).

Accordingly, attenuation control is applied to the VOA 51 to decrease the optical loss level at the VOA 51, that is, to decrease the amount of attenuation at the VOA 51 (as if the VOA 51 is bypassed to let the input light advance without attenuation).

If an optical signal of level '1' is input while the VOA 51 is set to decrease the amount of attenuation (as if the VOA 51 is bypassed), the SOA 52 would receive an excessive level of light and would operate in the saturation region. This would decrease the gain, saturate the optical output, and distort the output waveform.

FIG. 17 illustrates waveform deterioration caused by lowered gain. The vertical axis represents the SOA output level, and the horizontal axis represents the SOA input level. In the graph presenting the output level varying with the input level, the solid line g1 represents the actual SOA state, where the output is saturated with the input level exceeding L0. The dashed line g2 represents the ideal state, where the output is not saturated with the input level exceeding L0.

If the SOA 52 receives an excessively high level of optical input, the peak of the optical output signal of the SOA 52 is distorted. This would close eye apertures of the eye pattern, making it hard to differentiate between '0' and '1' on the receiving side.

Suppose that level '1' lasts long. If an optical signal having more '1' bits is input to the VOA 51, the VOA control unit 54 judges from the monitored value that the level of the optical input signal has been raised (see FIG. 15).

Accordingly, attenuation control is applied to the VOA 51 to increase the optical loss level at the VOA 51, that is, to increase the amount of attenuation at the VOA 51 (while the VOA 51 is operated to let the input light advance with attenuation).

If normal data (with almost equal numbers of '0' bits and '1' bits) is input to the VOA 51 which is set to increase the amount of attenuation (while the VOA 51 is operated normally), the SOA 52 would receive optical input at a lower level than is needed. Although the low input level will not make a saturation region, amplification to a desired output level will be impossible. The table in FIG. 18 lists the problems of the conventional optical amplifier 50 caused by the continuation of either level.

SUMMARY

According to an aspect of the present invention, a transmission apparatus for transmitting a signal includes a monitor unit which monitors the level of the signal and generates a monitored value, a level control unit which controls the level of the signal in accordance with the monitored value; and a control unit which manages and controls unit operation statuses in accordance with setting information. The control unit recognizes the period of duration of a single level in the signal, from a signal format given by the setting information, and performs variable control of at least one of a monitor time constant serving as a response time from when the signal is input to the monitor unit until the monitored value is generated, and a level setting time constant serving as a response time from when the monitored value is input to the level control unit until level control is performed, in accordance with the period of duration of the single level.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWING(S)

Figure 8:
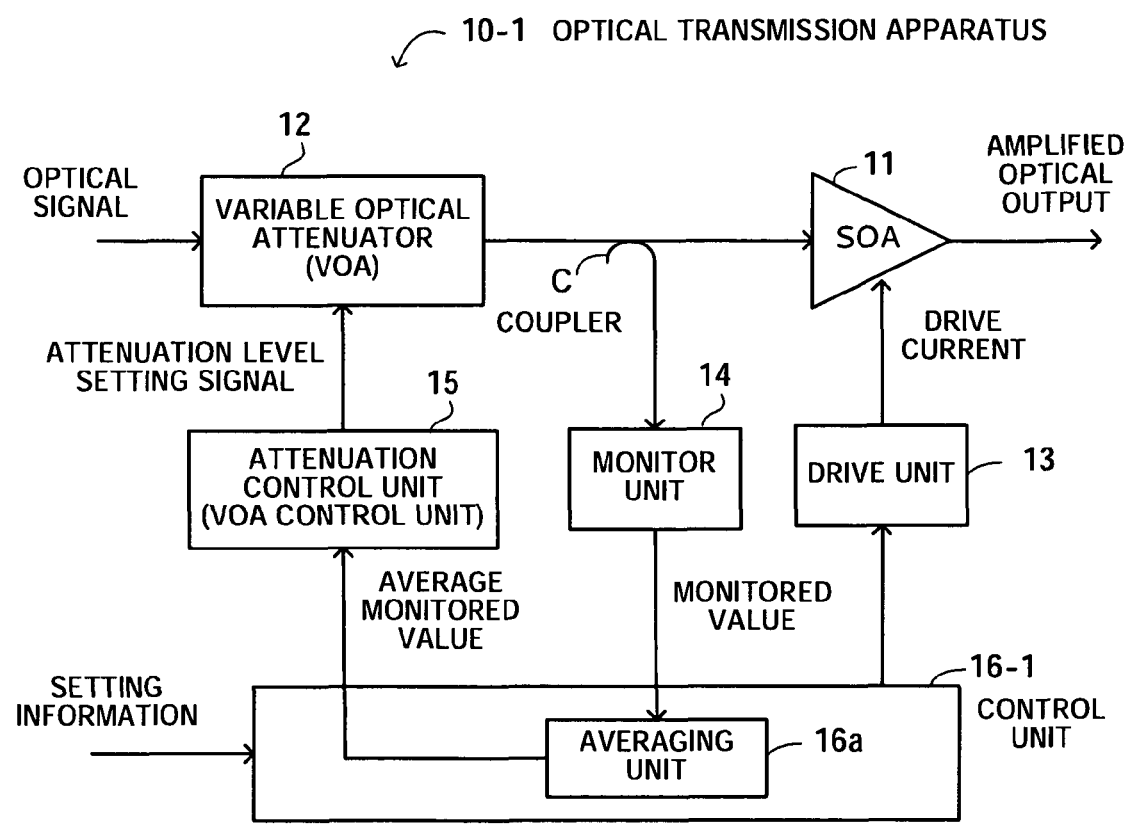
Figure 9:
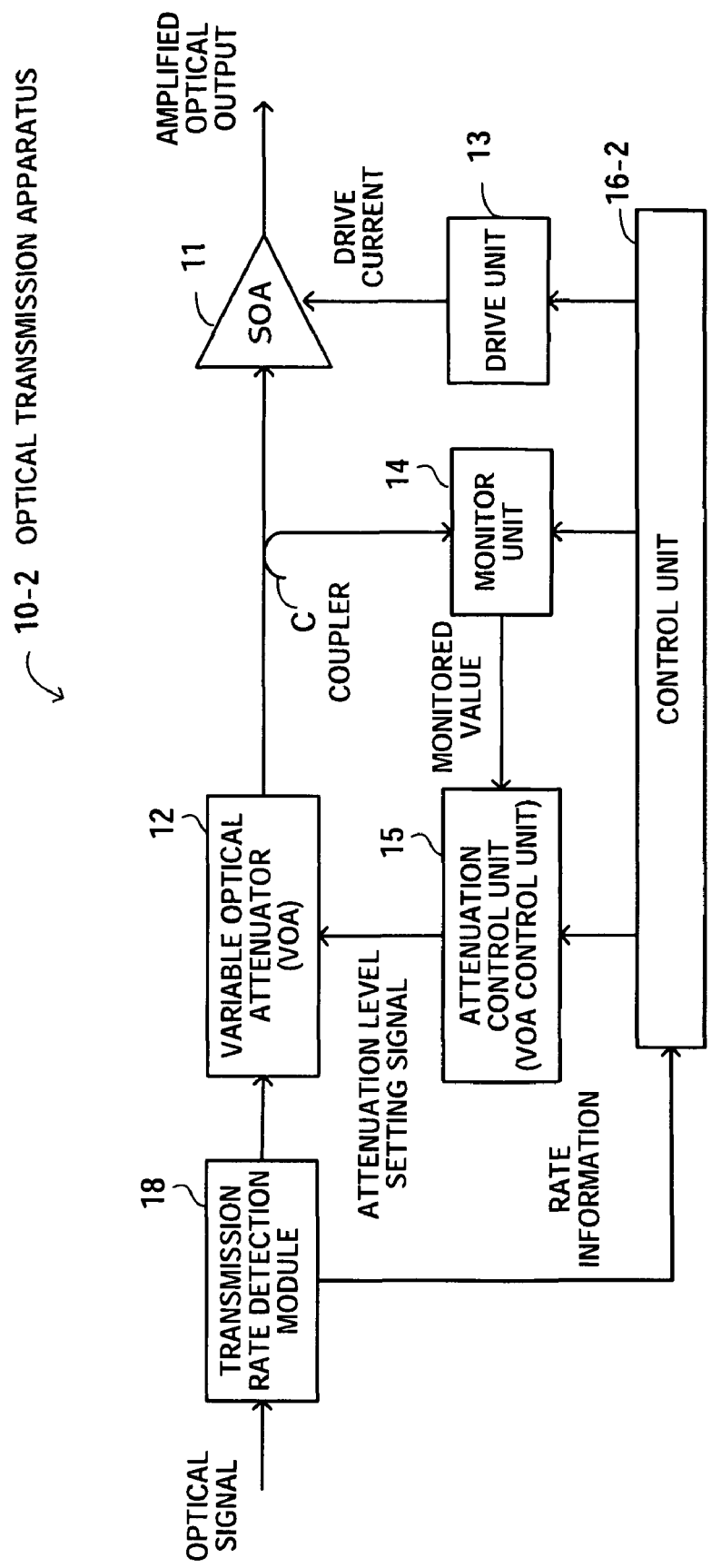
Figure 10:
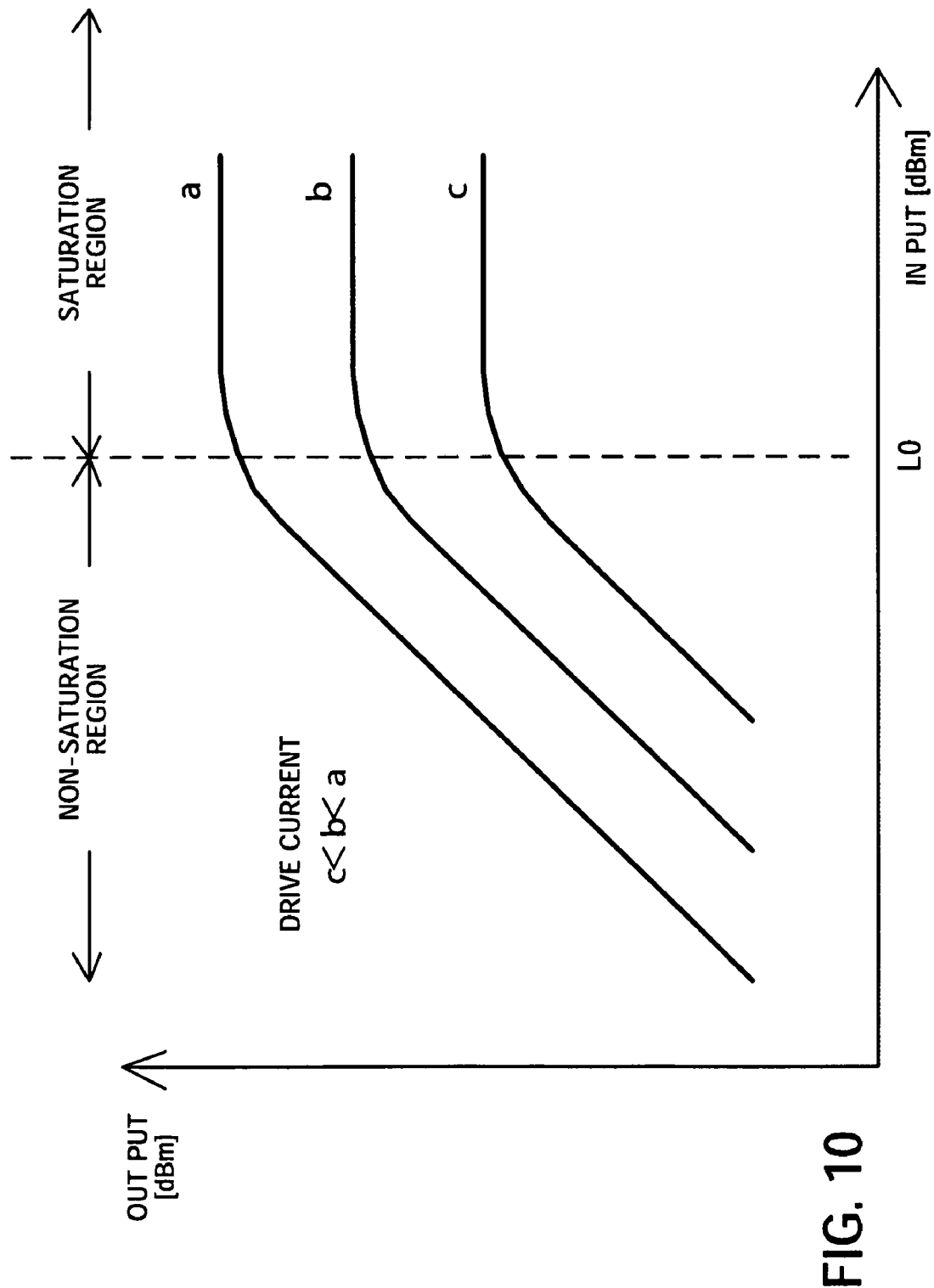
Figure 11:
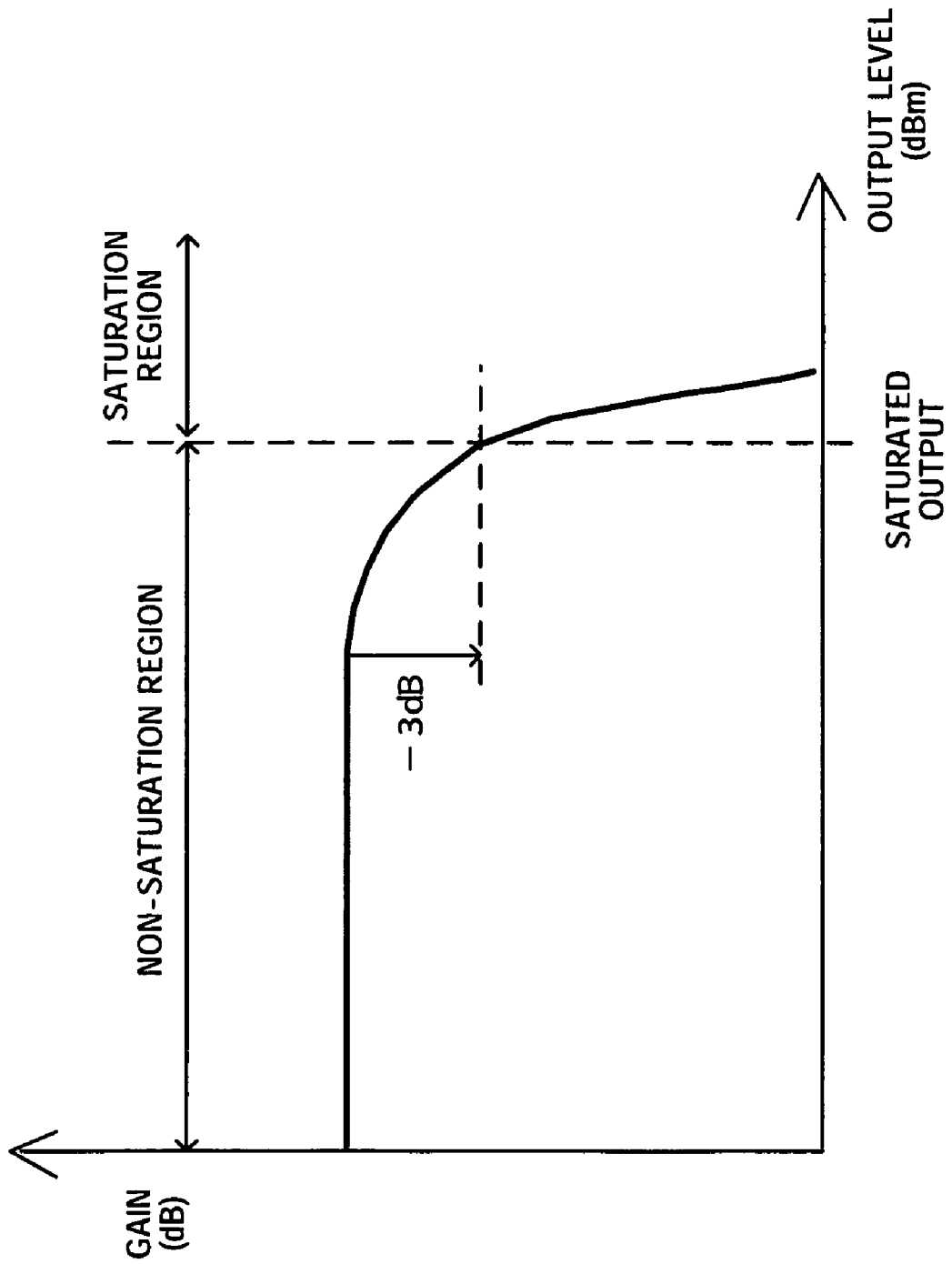
Figure 12:
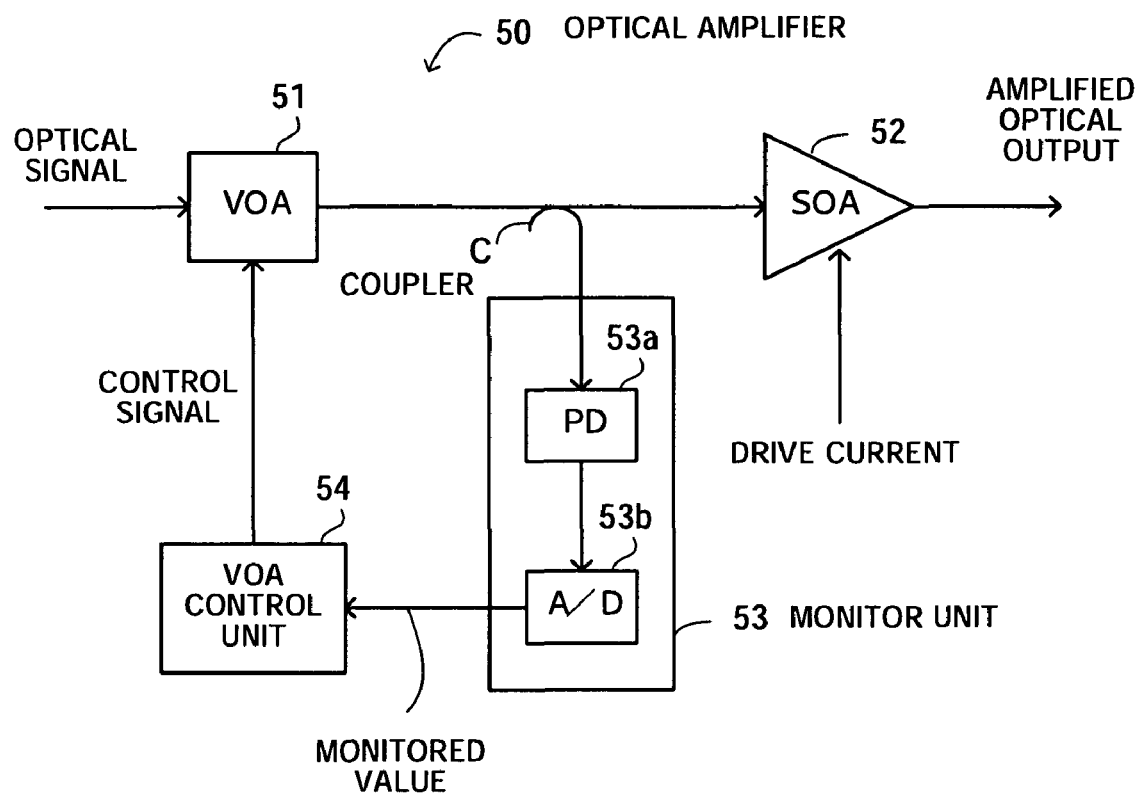
Figure 13:
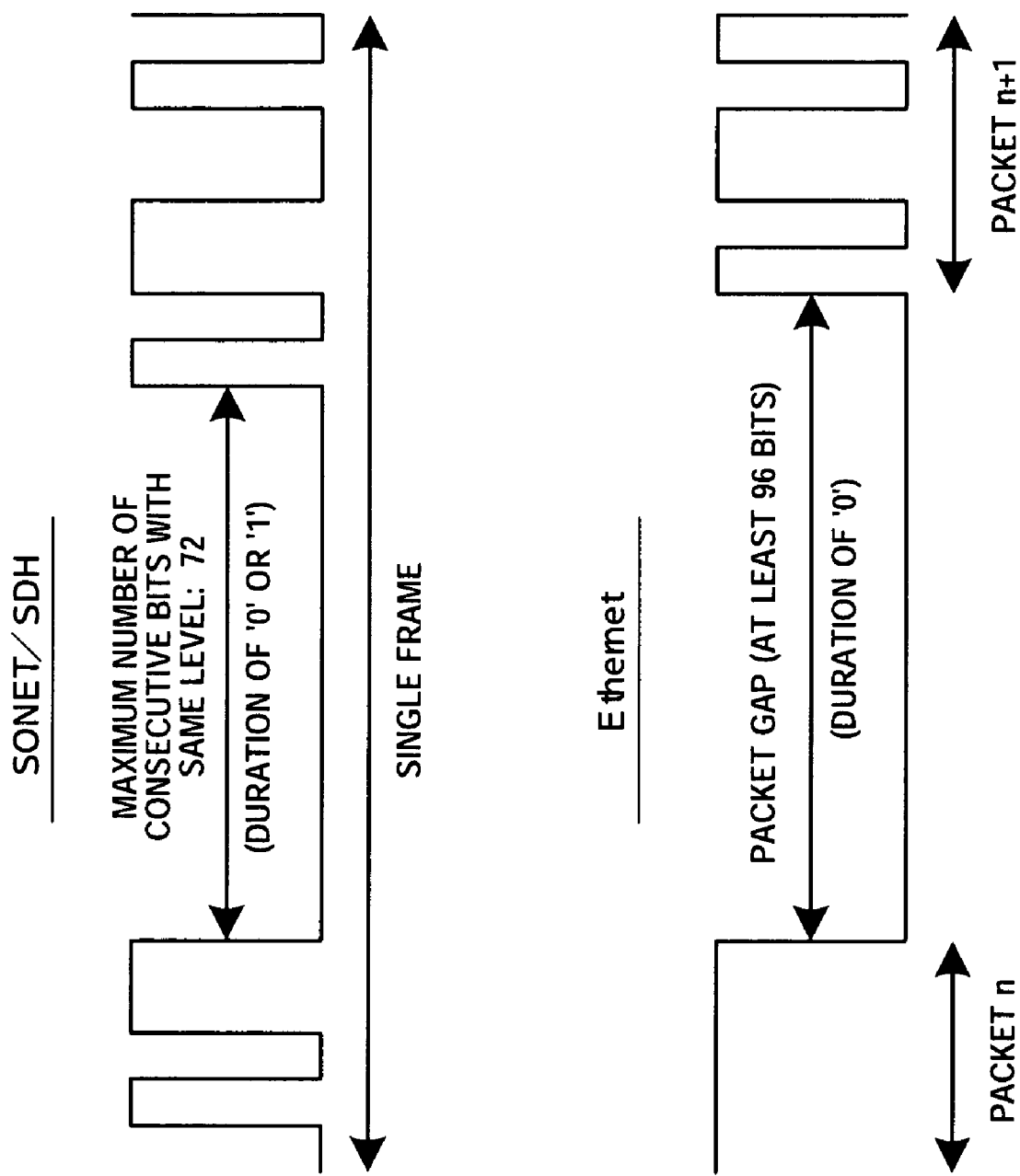
Figure 14:
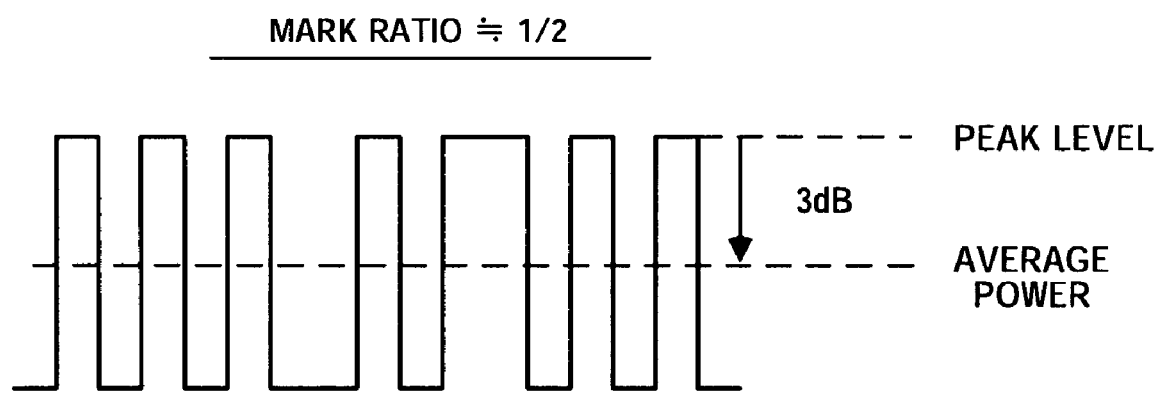
Figure 15:
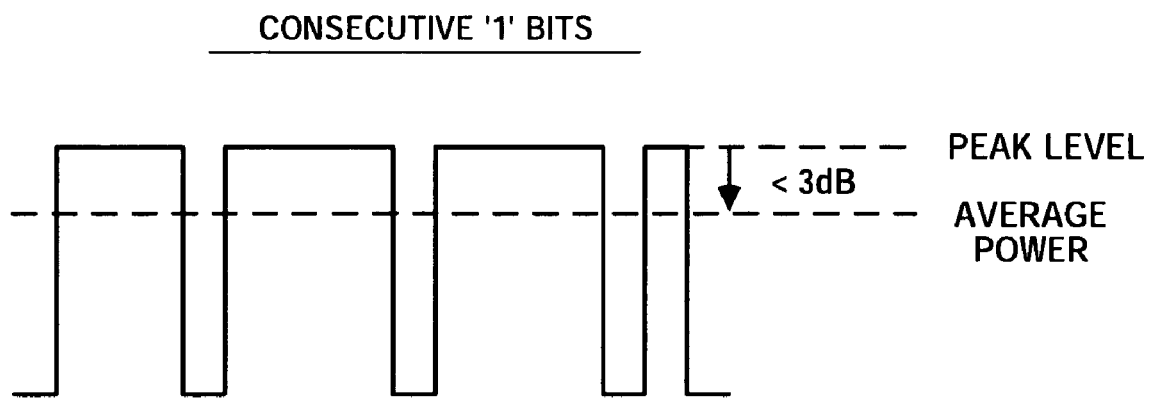
Figure 16:
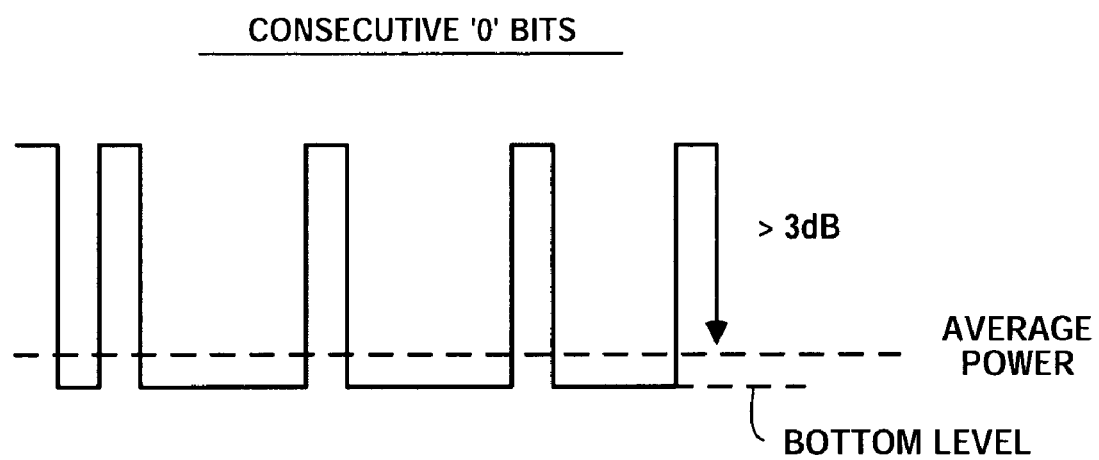
Figure 17:
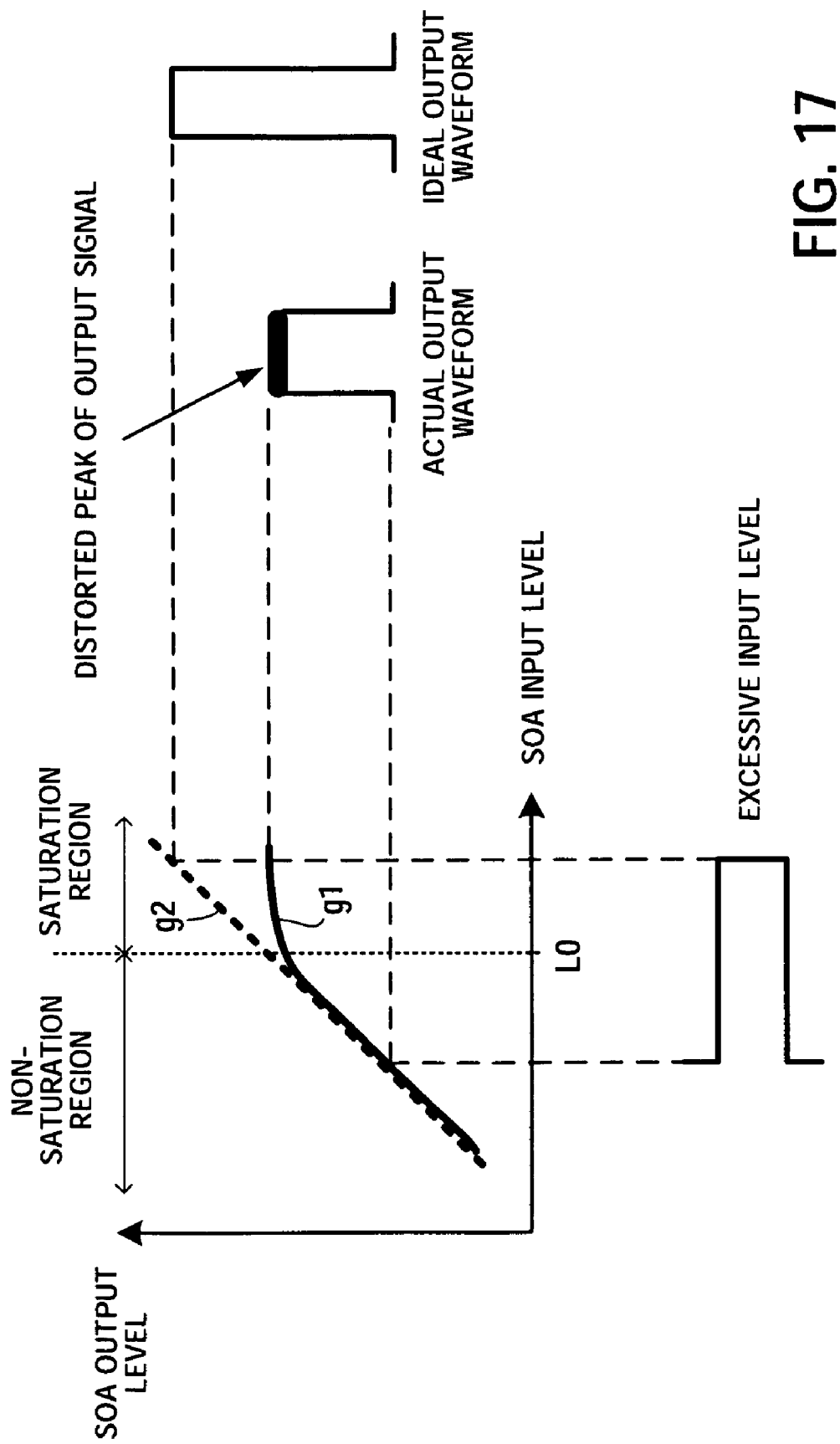

FIG. 7 presents tables listing periods of duration of single levels in different signal formats;

FIG. 8 is a diagram illustrating the structure of a modification of the optical transmission apparatus;

FIG. 9 is a diagram illustrating the structure of another modification of the optical transmission apparatus;

FIG. 10 presents a graph representing output levels of an SOA;

FIG. 11 presents a graph representing the gain of the SOA;

FIG. 12 is a diagram illustrating the structure of a conventional optical amplifier using the SOA;

FIG. 13 illustrates a single level maintained in different signal formats;

FIG. 14 is a view presenting monitored values depending on unbalanced bits;

FIG. 15 is another view presenting monitored values depending on unbalanced bits;

FIG. 16 is a further view presenting monitored values depending on unbalanced bits;

FIG. 17 is a view illustrating waveform deterioration caused by lowered gain; and FIG. 18 is a table listing problems of the conventional optical amplifier using the SOA.

DESCRIPTION OF EMBODIMENT(S)

Figure 1:
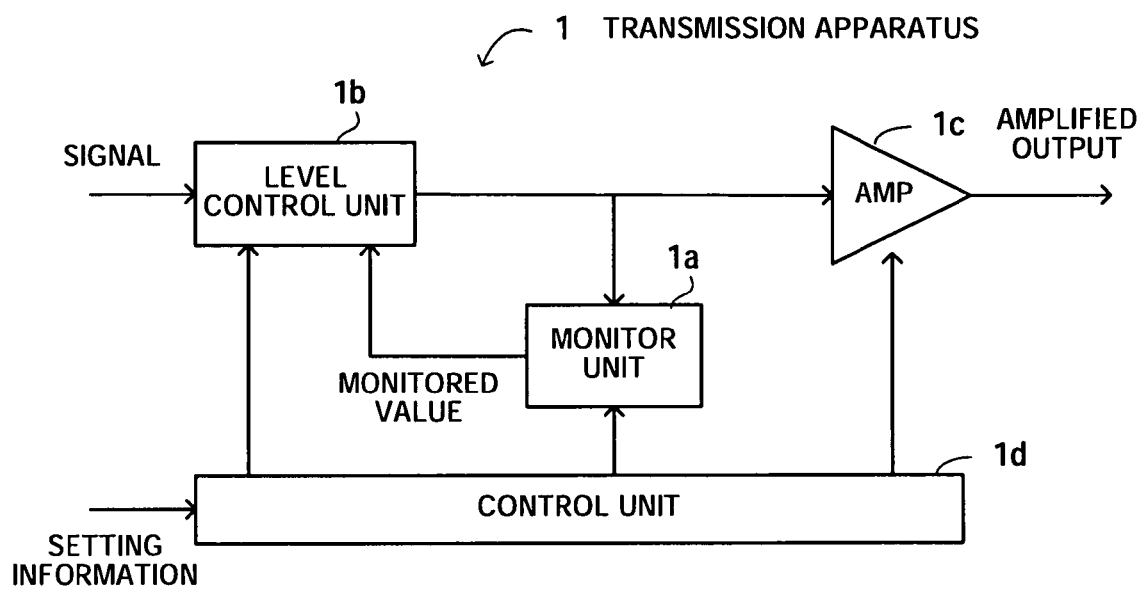
FIG. 1 is a diagram illustrating the principle of a transmission apparatus.

Embodiments of the present invention will be explained below with reference to the accompanying drawings, wherein like reference numerals refer to like elements throughout. FIG. 1 is a diagram illustrating the principle of a transmission apparatus 1. The transmission apparatus 1 includes a monitor unit 1*a*, a level control unit 1*b*, an output amplification unit 1*c*, and a control unit 1*d*.

The monitor unit 1*a* monitors the signal level and generates a monitored value. The level control unit 1*b* controls the level of the input signal in accordance with the monitored value. The output amplification unit 1*c* amplifies the level-controlled signal. The control unit 1*d* manages and controls the operation statuses of the monitor unit 1*a*, the level control unit 1*b*, and the output amplification unit 1*c* in accordance with setting information given from an external unit.

The control unit 1*d* recognizes the period of duration of a single level in the input signal, from the signal format given by the setting information, and performs variable control of at least one of a monitor time constant and a level setting time constant, in accordance with the period of duration of the single level.

The monitor time constant indicates a response time from when a signal is input to the monitor unit 1*a* until when the monitored value is generated. The level setting time constant indicates a response time from when the monitored value is input to the level control unit 1*b* until when level control is performed.

In variable time constant control, the control unit id increases either the monitor time constant or the level setting time constant if the signal format of the input signal has such a long period of duration of level '1' that the average power of the signal monitored by the monitor unit 1*a* approaches the peak level of the signal even though the input signal power does not increase in bits.

The control unit id also increases either the monitor time constant or the level setting time constant if the signal format of the input signal has such a long period of duration of level '0' that the average power of the signal monitored by the monitor unit 1*a* approaches the bottom level of the signal even though the power of the input signal does not decrease in bits.

If the control unit 1*d* recognizes from the signal format that the signal can be held to a single level for a period longer than the currently specified default monitor time constant, the control unit id updates the monitor time constant of the monitor unit 1*a* to a value greater than the period of duration of the single level.

Alternatively, if the control unit 1*d* recognizes from the signal format that the signal can be held to a single level for a period longer than the currently specified default level setting time constant, the control unit id updates the level setting time constant of the level control unit 1*b* to a value greater than the period of duration of the single level. Details of the variable time constant control will be described later with reference to FIGS. 3 to 5.

Figure 2:
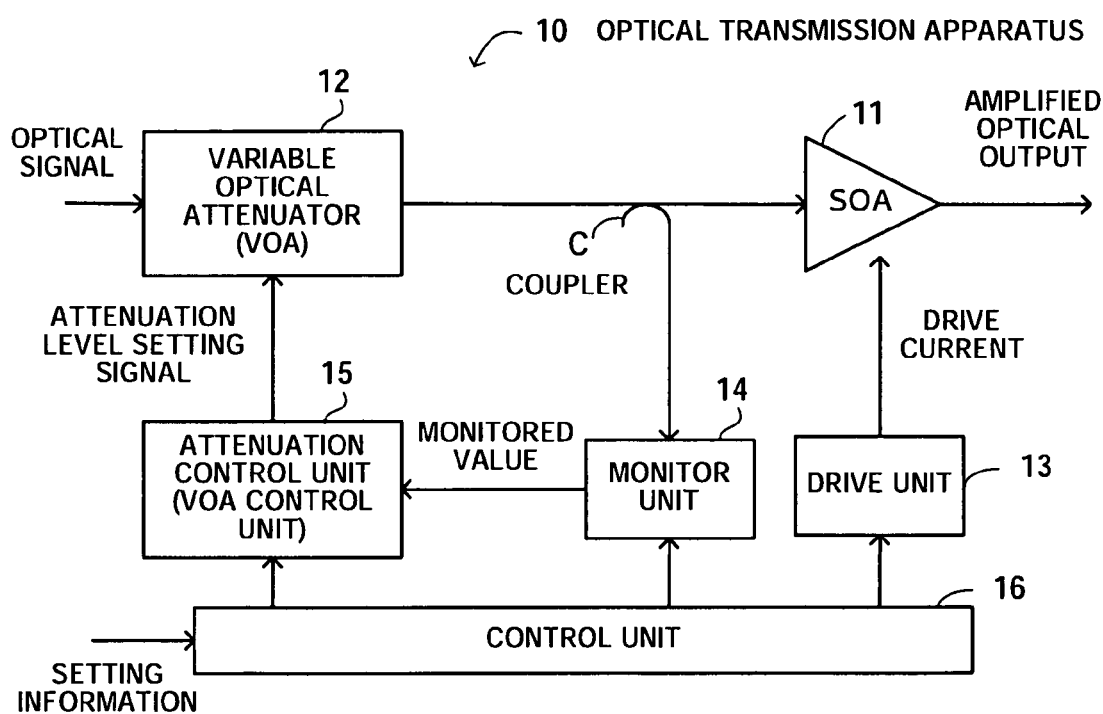
FIG. 2 is a diagram illustrating the principle of an optical transmission apparatus.

An optical transmission apparatus 10 utilizing the transmission apparatus 1 will be described next in detail. FIG. 2 is a diagram illustrating the principle of the optical transmission apparatus 10. The optical transmission apparatus 10 includes a semiconductor optical amplifier (SOA) 11, a variable optical attenuator (VOA) 12, a drive unit 13, a monitor unit 14, an attenuation control unit (VOA control unit) 15, a control unit 16, and a coupler C.

The SOA 11 amplifies the optical signal with its gain varied with drive current. The VOA 12 adjusts the attenuation level of the optical signal input to the SOA 11 in accordance with an attenuation level setting signal. The drive unit 13 controls the output of the drive current.

The coupler C splits the optical signal output from the VOA 12 into two parts, one part being sent to the SOA 11 and the other part being sent to the monitor unit 14. The monitor unit 14 receives the split optical signal, monitors the input level of the SOA 11, and outputs a monitored value.

The VOA control unit 15 generates an attenuation level setting signal provided for attenuation control performed by the VOA 12 to bring the input level of the SOA 11 to an appropriate level, in accordance with the monitored value. The control unit 16 manages and controls the operation statuses of the drive unit 13, the monitor unit 14, and the VOA control unit 15, in accordance with setting information given from an external unit. The setting information includes the signal format of the input optical signal, the transmission rate, and a desired output level of the SOA 11.

The structure in FIG. 2 is provided to monitor the input level of the SOA 11 and to perform attenuation control to keep an appropriate level of input to the SOA 11. The structure may have the coupler C at the output stage of the SOA 11 to monitor the output level of the SOA 11 and to perform attenuation control to keep an appropriate level of output from the SOA 11.

The control unit 16 is given the signal format by the setting information. Recognizing the period of duration of a single level in the signal format, the control unit 16 performs variable control of at least one of a monitor time constant and an attenuation level setting time constant, in accordance with the length of the period of duration of the single level.

The monitor time constant indicates a response time from when light is input to the monitor unit 14 until the monitored value is generated. The attenuation level setting time constant indicates a response time from when the monitored value is input to the VOA control unit 15 until when the attenuation level setting signal is generated.

Figure 3:
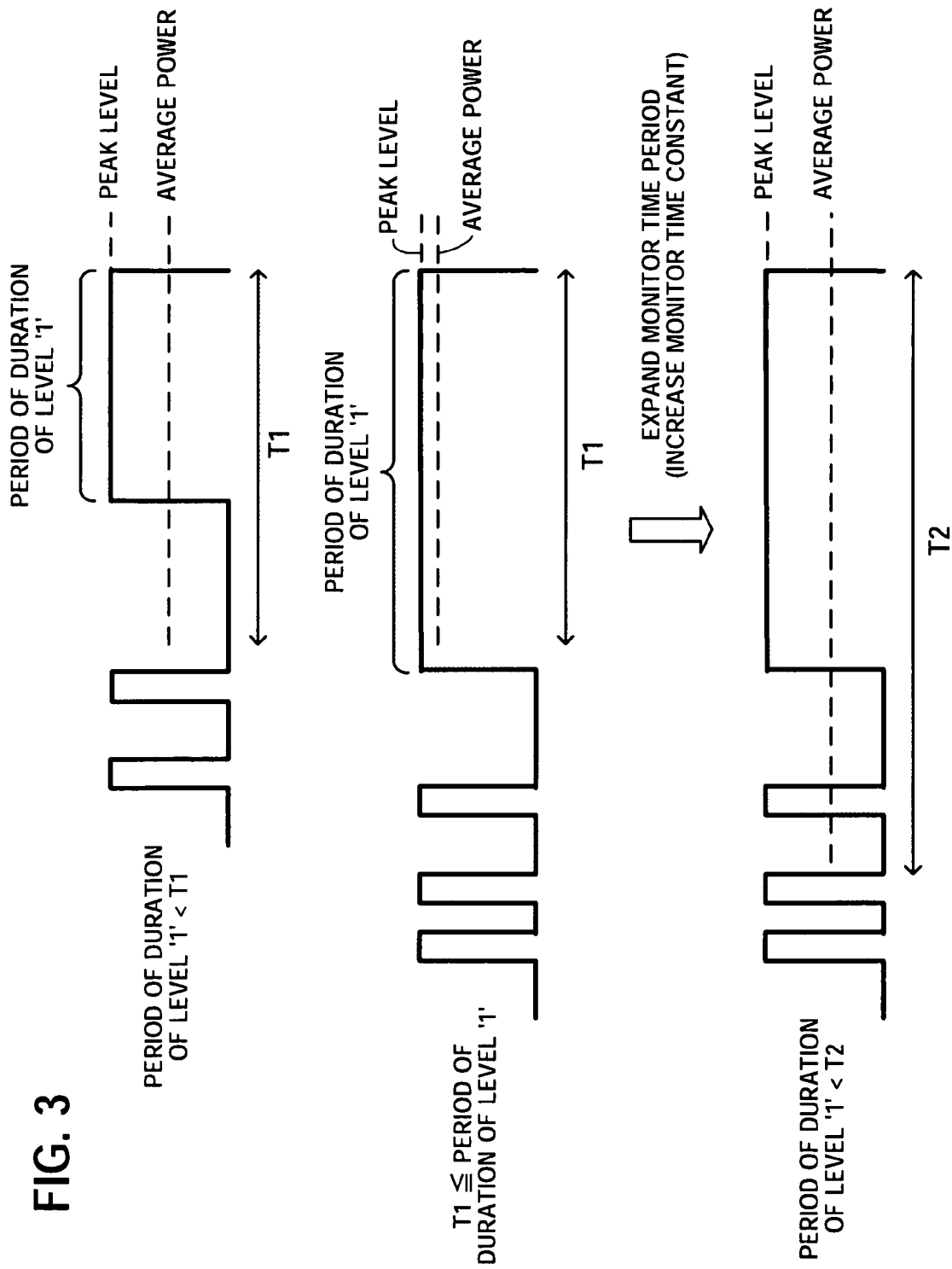
FIG. 3 is a view illustrating variable control of a monitor time constant.

Variable control of the monitor time constant will be described next. FIG. 3 is a view illustrating variable control of the monitor time constant. Illustrated variable monitor-time-constant control is performed when the optical signal is continuously held to '1'.

In its monitoring operation, the monitor unit 14 calculates the average power of the optical signal in a certain time domain (monitor time) and outputs the average power as a monitored value, as described earlier. The monitor unit 14 does not monitor the optical signal power in bits.

Let the current monitor time period of the monitor unit 14 be T1. When the optical signal held to '1' is input, if the period of duration of level '1' is smaller than the monitor time period T1 ((period of duration of level '1')<T1), the average power will not become very close to the peak level.

If the period of duration of level '1' becomes greater than or equal to the monitor time period T1 (T1≦(period of duration of level '1')), the average power of the optical signal monitored by the monitor unit 14 approaches the peak level of the optical signal even though the power of the optical signal does not increase in bits.

If that occurs, the VOA 12 would consider that the level of the optical signal has increased, against the reality, and would increase the attenuation amount, as described earlier. Since the VOA 12 would suppress the level of the optical signal input to the SOA 11, a desired level of output could not be obtained from the SOA 11.

Therefore, if the input optical signal has a period of duration of level '1' exceeding the monitor time period T1, the problem of the average power approaching the peak level without an actual increase in optical signal power can be suppressed by expanding the monitor time period T1 to a monitor time period T2 (period of duration of level '1'<T2) and obtaining the average power of the optical signal in the monitor time period T2 (by obtaining the average power in a longer time span). This can stabilize the output state of the SOA 11. To expand the monitor time period from T1 to T2 means to increase the monitor time constant.

Figure 4:
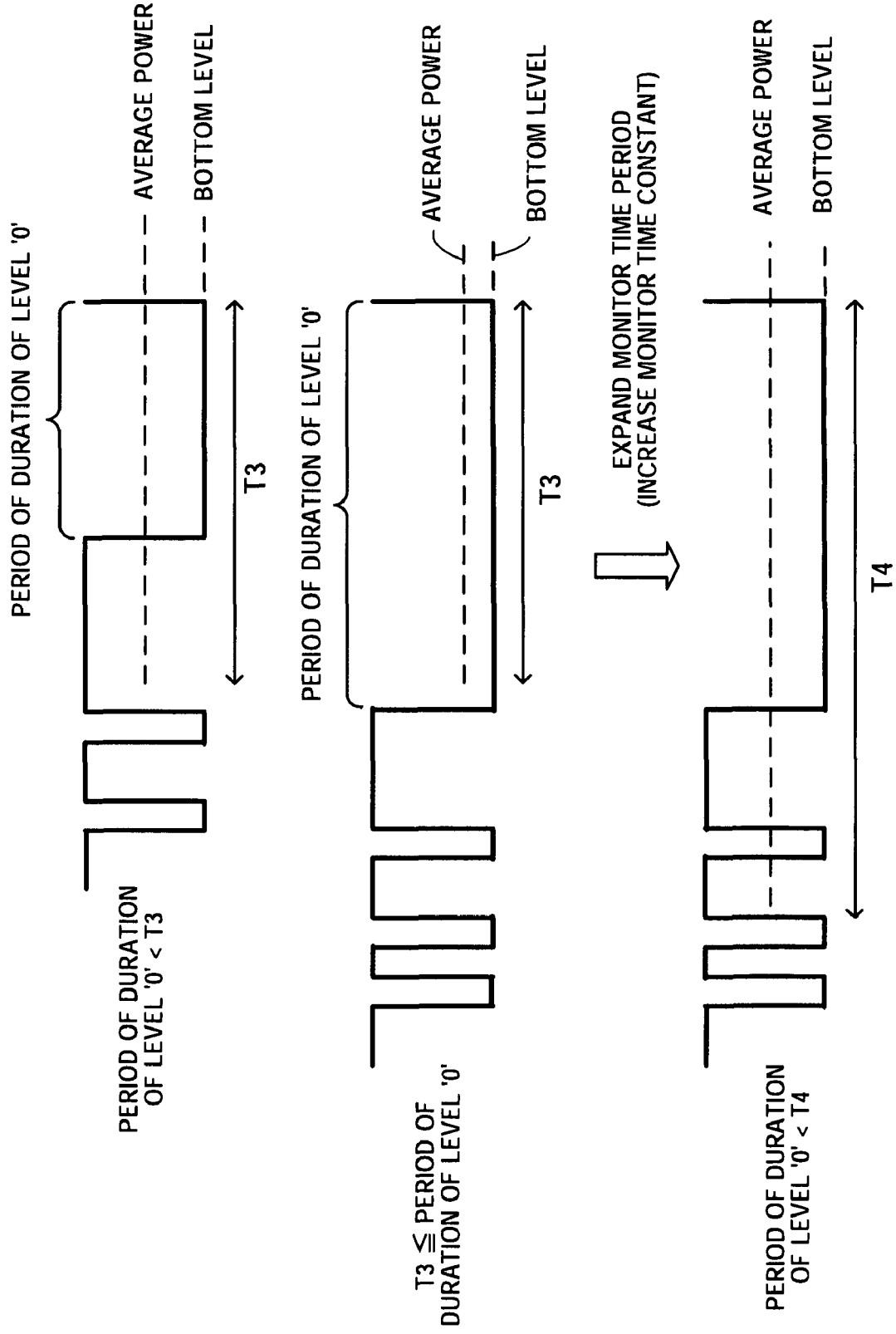
FIG. 4 is a view illustrating the variable control of the monitor time constant.

FIG. 4 is a view illustrating variable control of the monitor time constant. Illustrated variable monitor-time-constant control is performed when the optical signal is continuously held to level '0'. Let the current monitor time period in the monitor unit 14 be T3. When the optical signal held to level '0' is input, if the period of duration of level '0' is smaller than the monitor time period T3 ((period of duration of level '0')<T3), the average power will not become very close to the bottom level.

If the period of duration of level '0' becomes greater than or equal to the monitor time period T3 (T3≦(period of duration of level '0')), the average power of the optical signal monitored by the monitor unit 14 approaches the bottom level of the optical signal even though the power of the optical signal is not lowered in bits.

If that occurs, the VOA 12 would consider that the level of the optical signal has decreased, against the reality, and would reduce the attenuation amount, as described earlier. Because an excessive level of optical signal is input to the SOA 11, the output of the SOA 11 would be saturated.

Therefore, if the input optical signal has a period of duration of level '0' exceeding the monitor time period T3, the problem of the average power approaching the bottom level without an actual decrease in optical signal power can be suppressed by expanding the monitor time period T3 to a monitor time period T4 ((period of duration of level '0')<T4) and obtaining the average power of the optical signal in the monitor time period T4 (by obtaining the average power in a longer time span). This can stabilize the output state of the SOA 11. To expand the monitor time from T3 to T4 means to increase the monitor time constant.

If the input optical signal has such a long period of duration of level '1' that the average power of the monitored optical signal approaches the peak level of the optical signal without an actual increase in optical signal power in bits, the control unit 16 can suppress deterioration in transmission characteristics caused by the continuation of a single level in the optical signal, by increasing the monitor time constant.

If the input optical signal has such a long period of duration of level '0' that the average power of the monitored optical signal approaches the bottom level of the optical signal without an actual decrease in optical signal power in bits, the control unit 16 can suppress deterioration in transmission characteristics caused by the continuation of a single level in the optical signal, by increasing the monitor time constant.

Figure 5:
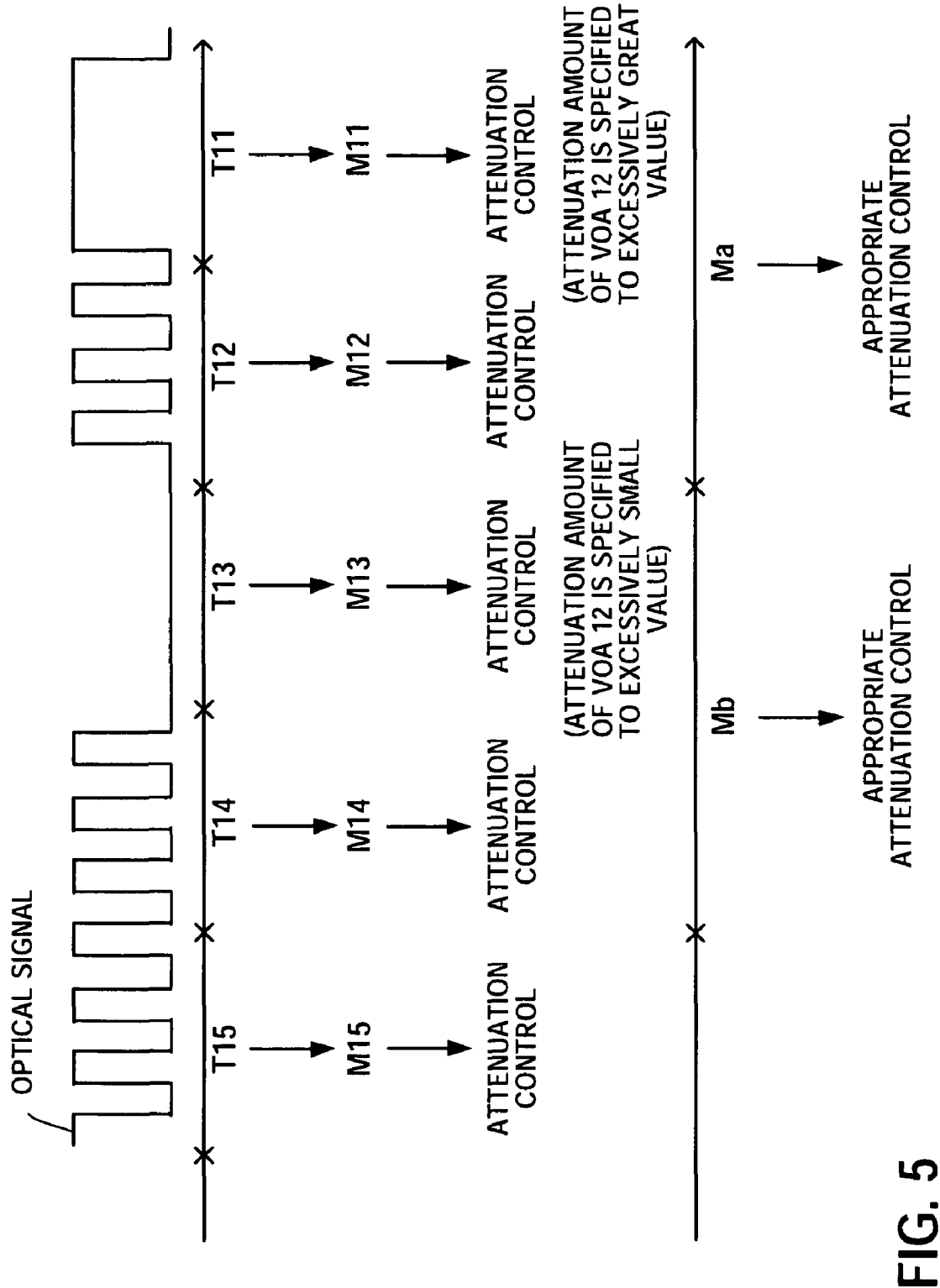
FIG. 5 is a view illustrating variable control of an attenuation level setting time constant.

Variable control of the attenuation level setting time constant will be described next. FIG. 5 is a view illustrating variable control of the attenuation level setting time constant. It is assumed that the monitor unit 14 monitors the optical signal with a fixed monitor time constant, without updating the monitor time constant.

The monitor unit 14 monitors the optical signal in monitor time periods T11, T12, T13, and so on, and outputs the monitored results as monitored values M11, M12, M13, and so on. Suppose that the optical signal is continuously held to level '1' in the monitor time period T11 and is continuously held to level '0' in the monitor time period T13.

If attenuation control is performed in accordance with the currently specified attenuation level setting time constant, the VOA control unit 15 performs attenuation control of the VOA 12 in accordance with the monitored values M11, M12, M13, and so on.

Since the monitor time period T11 is a time zone in which level '1' is continuously held, the monitored value M11 is a large value representing the average power close to the peak level of the optical signal. Attenuation control based on the monitored value M11 would specify an excessively great amount of attenuation on the VOA 12.

Since the monitor time period T13 is a time zone in which level '0' is continuously held, the monitored value M13 is a small value representing the average power close to the bottom level of the optical signal. Attenuation control based on the monitored value M13 would specify an excessively small amount of attenuation on the VOA 12.

To adjust the attenuation amount of the VOA 12 appropriately even while a single level lasts long, the attenuation amount should be controlled in accordance with the average amount of the monitored values M11, M12, M13, and so on rather than in accordance with the individual monitored values.

In FIG. 5, the attenuation amount for the VOA 12 will not be excessively large if the attenuation level setting signal is generated in accordance with the average value Ma of the monitored values M11 and M12, for instance. If the attenuation level setting signal is generated in accordance with the average value Mb of the monitored values M13 and M14, the attenuation amount for the VOA 12 will not be excessively small.

To obtain the average value of monitored values and to generate an attenuation level setting signal in accordance with the average value in the VOA control unit 15 is to increase the attenuation level setting time constant, which is a response time from when the monitored value is input until an attenuation level setting signal is generated.

If the input optical signal has such a long period of duration of level '1' that the average power of the monitored optical signal approaches the peak level of the optical signal even though the optical signal power does not increase in bits, the control unit 16 can suppress the deterioration of transmission characteristics caused by the continuation of a single level in the optical signal, by increasing the attenuation level setting time constant.

If the input optical signal has such a long period of duration of level '0' that the average power of the monitored optical signal approaches the bottom level of the optical signal even though the optical signal power does not decrease in bits, the control unit 16 can suppress deterioration in transmission characteristics caused by the continuation of a single level in the optical signal, by increasing the attenuation level setting time constant.

Figure 6:
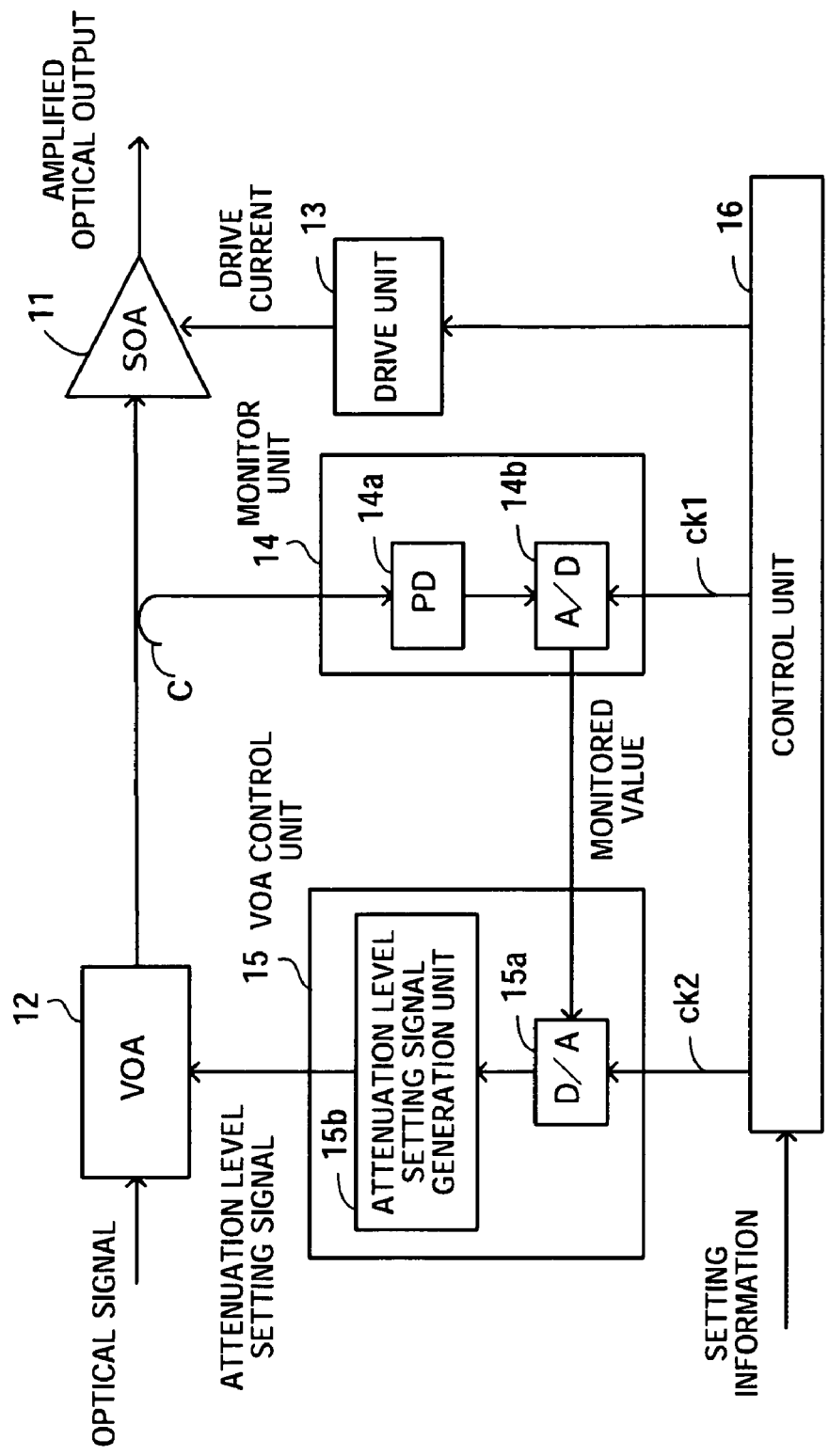
FIG. 6 is a diagram illustrating the structure of the optical transmission apparatus.

The structure of the optical transmission apparatus 10 will be described next. FIG. 6 is a diagram illustrating the structure of the optical transmission apparatus 10. The diagram illustrates the internal structures of the monitor unit 14 and the VOA control unit 15, and the other elements are the same as in FIG. 1.

The monitor unit 14 includes a PD 14a and an A-D converter 14b. The VOA control unit 15 includes a D-A converter 15a and an attenuation level setting signal generation unit 15b. The PD 14a converts the optical signal split by the coupler C to an electric signal. The A-D converter 14b converts the analog electric signal to a digital electric signal and outputs it as a monitored value. The D-A converter 15a converts the digital monitored value to an analog value. The attenuation level setting signal generation unit 15b generates an attenuation level setting signal in accordance with the analog value.

The control unit 16 supplies the A-D converter 14b with a clock signal ck1 (first clock signal) for use in conversion of the electric signal output from the PD 14a to a digital monitored value. The control unit 16 supplies the D-A converter 15a with a clock signal ck2 (second clock signal) for use in conversion of the digital monitored value to an analog value.

When the period of duration of a single level in the currently received signal is recognized from the signal format given by the setting information, the control unit 16 performs variable control of the monitor time constant by varying the frequency of the clock signal ck1 in accordance with the length of duration of the single level or performs variable control of the attenuation level setting time constant by varying the frequency of the clock signal ck2.

Lowering the frequency of the clock signal ck1 expands the monitor time period, as has been described earlier with reference to FIGS. 3 and 4, and increases the monitor time constant. Lowering the frequency of the clock signal ck2 is to average monitored values, as has been described earlier with reference to FIG. 5, and the attenuation level setting time constant is increased.

A clock generation unit for generating the clock signals ck1 and ck2 in the control unit 16 can be formed by a field programmable gate array (FPGA) and other elements. The clock rate can be changed to a desired value by programming.

When the monitor time constant or the attenuation level setting time constant is updated, the control unit 16 varies the drive current setting value to be sent to the drive unit 13 so that a change in output level from the SOA 11 accompanying the update of the time constant is suppressed. The drive unit 13 generates drive current in accordance with the drive current setting value sent from the control unit 16 and supplies the drive current to the SOA 11.

The drive current determines the level at which the output of the SOA 11 is saturated. Since the value of drive current for the SOA 11 is known, if the relationship between the input level and the output level at drive current (gain) is stored beforehand, the control unit 16 can adjust the drive current to provide a gain difference corresponding to a change in input level (to avoid output saturation), in case of a control error caused by the updated time constant.

The period of duration of a single level in each signal format will be described next. FIG. 7 presents tables listing the periods of duration of single levels in different signal formats. The optical signals input to the optical transmission apparatus 10 include the SONET/SDH and Ethernet signals.

The SONET signals are divided into the following formats: OC (optical carrier)–192 (9953.28 Mbps), OC-48 (2488.32 Mbps), OC-12 (622.08 Mbps), and OC-3 (155.52 Mbps). In any of these OC-n formats, the maximum numbers of consecutive '1' bits and consecutive '0' bits are limited to 72.

Therefore, the maximum period of duration of a single level is 7.23 ns (=72 bits×1/9953.28 Mbps) for the OC-192 format, 28.94 ns (=72 bits×1/2488.32 Mbps) for the OC-48 format, 115.74 ns (=72 bits×1/622.08 Mbps) for the OC-12 format, and 462.96 ns (=72 bits×1/155.52 Mbps) for the OC-3 format.

Like the SONET signals, the SDH signals have different formats: STM (synchronous transmission module)-64, STM-16, STM-4, and STM-1. The period of duration of a single level can be calculated in the same way as in SONET. The table in FIG. 7 lists just the SONET format names.

The Ethernet signals are divided into the following types: 10 GbE (10-gigabit Ethernet: 10312.5 Mbps), GbE (gigabit Ethernet: 1250 Mbps), and Fast Ethernet (125 Mbps). The minimum packet gap of these Ethernet formats is set to 96 bits.

In the optical transmission apparatus 10, variable time constant control is applied to the Ethernet optical signal based on the period of duration of a single level in the packet gap (period of duration of level '0'). The period of duration of level '0' in 10 GbE is 9.31 ns (=96 bits×1/10312.5 Mbps); the period of duration of level '0' in GbE is 76.80 ns (=96 bits×1/1250 Mbps); and the period of duration of level '0' in Fast Ethernet is 768.00 ns (=96 bits×1/125 Mbps).

The variable time constant control in the optical transmission apparatus 10 will be described below by using specific values. As given in FIG. 7, the OC-3 format has the longest period of duration of a single level among the SONET/SDH formats, and the Fast Ethernet format has the longest packet gap among the Ethernet formats. A control operation is performed to increase the time constants for the optical signal of the OC-3 or Fast Ethernet format.

(1) Clock Control of the A-D Converter 14b

Suppose that the default frequency of the clock signal ck1 of the A-D converter 14b is 20 MHz and that the A-D update time (A-D refresh interval) is 2.4 μs. The OC-3 or Fast Ethernet format is given by the setting information.

In the OC-3 specifications, the maximum period of duration of a single level ('0' or '1') can be about 0.46 μs. In accordance with the packet gap rule, the Fast Ethernet format has a level-'0' period of at least 0.77 μs. Because the maximum value is not specified, level '0' can be held for several microseconds.

Because these periods of duration of single levels are close to the A-D update time of 2.4 μs, the continuation of a single level can cause an unusual change in monitored values (the calculated average power can be close to the peak level of the optical signal even though the optical signal power does not increase in bits; the calculated average power can be close to the bottom level of the optical signal even though the optical signal power does not decrease in bits).

Accordingly, the frequency of the clock signal ck1 is divided by 32, for instance, to increase the interval of conversion from the analog value to the digital value. Then, the frequency of the clock signal ck1 becomes 625 kHz (=20 MHz/32), and the A-D update time becomes about 77 μs (≈2.4 μs×32).

By lowering the frequency of the clock signal ck1, the A-D refresh interval is expanded to increase the response time of conversion from the analog value to the digital value, so that the effect of the continuation of a single level is lessened. Since an excessively low clock rate makes it impossible to detect a change as desired, some kind of lower limit would be needed. The lower limit of the division ratio could be set to 1/256 or 1/512, for example.

(2) Clock Control of the D-A Converter 15a

The same clock control can be applied to the D-A converter 15a as to the A-D converter 14b. Suppose that the default frequency of the clock signal ck2 of the D-A converter 15a is 10 MHz, the D-A update time (D-A refresh interval) is 2.4 μs, and the OC-3 or Fast Ethernet format is given by the setting information.

In the same way as for the A-D converter 14b, the frequency of the clock signal ck2 is divided by 32 to expand the interval of conversion from the digital value to the analog value. Then, the frequency of the clock signal ck2 becomes 312 kHz (≈10 MHz/32), and the A-D update time becomes about 77 μs (≈2.4 μs×32).

By lowering the frequency of the clock signal ck2, the D-A refresh interval is expanded to increase the response time of conversion from the digital value to the analog value, so that the effect of the continuation of a single level is lessened.

In the description given above, the time constants are increased when the optical signal of the OC-3 or Fast Ethernet format, which has the longest continuation of a single level, is input. The time constants may also be varied in each format.

If a signal format that can have a period of duration of a single level longer than the currently specified default monitor time constant is recognized, the monitor time constant of the monitor unit 14 may be updated to exceed the period of duration of the single level in the signal format.

If a signal format that can have a period of duration of a single level longer than the currently specified attenuation level setting time constant is recognized, the attenuation level setting time constant of the VOA control unit 15 may be updated to exceed the period of duration of the single level in the signal format.

If the varied time constants are close to the period of duration of a single level, a highly sensitive reaction to a variation in power can cause an oscillation. If the time constants are increased excessively, the response time to an actual change in input can be affected. The optical amplifier such as the SOA 11 needs to follow abrupt signal changes (several milliseconds). It would be appropriate to set the target time constants to about two to ten times the period of duration of the corresponding level, with a low transmission rate also being taken into account.

A modification of the optical transmission apparatus 10 will be described next. FIG. 8 is a diagram illustrating a modification of the optical transmission apparatus 10. In the modified optical transmission apparatus 10-1, the clock signal ck1 or ck2 supplied to the A-D converter 14b in the monitor unit 14 or to the D-A converter 15a in the VOA control unit 15 is not controlled. In the control unit 16-1, the monitored values are averaged, and the number of times of averaging is changed to perform variable control of the time constant. Since the basic structure is the same as that in FIG. 2, different elements will be described below.

The control unit 16-1 includes an averaging unit 16a. If the control unit 16-1 recognizes that the period of duration of a single level does not exceed a corresponding threshold value in a signal format given by the setting information, the averaging unit 16a sends the monitored value output from the monitor unit 14 as it is to the VOA control unit 15 and allows an attenuation level setting signal to be generated in accordance with the monitored value. This means that the time constant is not updated if the period of duration of a single level is smaller than the threshold value.

In contrast, if the control unit 16-1 recognizes that the period of duration of a single level in the input optical signal exceeds a corresponding threshold value, the averaging unit 16a averages n monitored values output from the monitor unit 14 to generate an average monitored value and sends the average monitored value to the VOA control unit 15. The VOA control unit 15 generates an attenuation level setting signal in accordance with the average monitored value.

By averaging the monitored values and generating the attenuation level setting signal in accordance with the average monitored value, the time constant, which is a response time from the beginning of monitoring until the generation of the attenuation level setting signal (can also be called a loop time constant), is increased.

In the modified optical transmission apparatus 10-1, neither the monitor unit 14 nor the VOA control unit 15 performs variable control of the corresponding time constant. However, the averaging unit 16a averages the monitored values, and the attenuation control of the VOA 12 is performed in accordance with the averaged monitored value.

Neither the monitor unit 14 nor the VOA control unit 15 performs variable time constant control. Both units perform respective control operations with fixed time constants. The control unit 16-1 has the variable time constant control function illustrated in FIG. 5. This structure can produce the same advantages as the optical transmission apparatus 10 in FIG. 6.

The threshold value is specified for each of the period of duration of level '1' and the period of duration of level '0' that can cause an unusual change in monitored values. The period of duration of level '1' that can cause an unusual change in monitored values is such a long period of duration of level '1' that the average power of the optical signal monitored by the monitor unit 14 approaches the peak level of the optical signal even though the optical signal power does not increase in bits.

The period of duration of level '0' that can cause an unusual change in monitored values is such a long period of duration of level '0' that the average power of the optical signal monitored by the monitor unit 14 approaches the bottom level of the optical signal even though the optical signal power does not decrease in bits.

If the signal format of the input optical signal has a period of duration of a single level exceeding a predetermined period of duration of either level '1' or level '0', the monitored values are averaged to increase the time constant.

FIG. 9 is a diagram illustrating another modification of the optical transmission apparatus 10. The modified optical transmission apparatus 10-2 includes a transmission rate detection module 18 in the input stage of the VOA 12. The other elements are the same as in FIG. 2.

The transmission rate detection module 18 is a multi-rate clock data recovery (CDR) chip, which can operate in synchronization with a plurality of determined signal rates, or an any-rate CDR chip, which can operate in synchronization with a given signal rate. The module 18 knows its own rate by being synchronized automatically with the input signal rate and can be operated without any setting from the outside.

The control unit 16-2 obtains rate information output from the transmission rate detection module 18 as setting information and recognizes the format of the optical signal from the rate information. This structure may be used in which the signal format is recognized from the rate information detected by the transmission rate detection module 18, without receiving signal format information externally, and the period of duration of a single level is recognized accordingly.

Deterioration in transmission characteristics caused by the continuation of a single level in a signal is suppressed to improve the transmission quality.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has(have) been described in detail, it should understood that various changes, substitutions, and alterations could be made hereto without departing from the spirit and scope of the invention.

What is claimed is:

1. A transmission apparatus for transmitting a signal, comprising:
    a monitor unit which monitors a level of the signal and generates a monitored value;
    a level control unit which controls the level of the signal in accordance with the monitored value; and
    a control unit which manages and controls unit operation statuses in accordance with setting information;
    wherein the control unit recognizes the period of duration of a single level in the signal, from a signal format given by the setting information and performs variable control of at least one of a monitor time constant serving as a response time from when the signal is input to the monitor unit until the monitored value is generated, and a level setting time constant serving as a response time from when the monitored value is input to the level control unit until level control is performed, in accordance with the period of duration of the single level.

2. The transmission apparatus according to claim 1, wherein the control unit increases the monitor time constant or the level setting time constant if the input signal has such a long period of duration of level '1' that an average power of the signal monitored by the monitor unit approaches a peak level of the signal even though a signal power does not increase in bits, and increases the monitor time constant or the level setting time constant if the input signal has such a long period of duration of level '0' that the average power of the signal monitored by the monitor unit approaches a bottom level of the signal even though the signal power does not decrease in bits.

3. The transmission apparatus according to claim 1, wherein, if the control unit recognizes from the signal format that the single level can be held for a period longer than the currently specified monitor time constant, the control unit updates the monitor time constant to a value exceeding the period of duration of the single level in the signal format, and, if the control unit recognizes from the signal format that the single level can be held for a period longer than the currently specified level setting time constant, the control unit updates the level setting time constant to a value exceeding the period of duration of the single level in the signal format.

* * * * *